(12) United States Patent
Gallant

(10) Patent No.: US 8,544,789 B2
(45) Date of Patent: Oct. 1, 2013

(54) DEVICE FOR ATTACHING A LIFT MEMBER TO THE FUSELAGE OF AN AIRCRAFT

(75) Inventor: Guillaume Gallant, Plaisance du Touch (FR)

(73) Assignee: Airbus Operations SAS, Toulouse (FR)

( * ) Notice: Subject to any disclaimer, the term of this patent is extended or adjusted under 35 U.S.C. 154(b) by 629 days.

(21) Appl. No.: 12/595,261

(22) PCT Filed: Apr. 15, 2008

(86) PCT No.: PCT/FR2008/050668
§ 371 (c)(1),
(2), (4) Date: Mar. 23, 2010

(87) PCT Pub. No.: WO2008/145892
PCT Pub. Date: Dec. 4, 2008

(65) Prior Publication Data
US 2010/0200691 A1    Aug. 12, 2010

(30) Foreign Application Priority Data
Apr. 17, 2007   (FR) ...................... 07 54529

(51) Int. Cl.
*B64C 1/26* (2006.01)
(52) U.S. Cl.
USPC .......................................................... 244/38
(58) Field of Classification Search
USPC ............. 244/38, 35 R, 119, 131, 39, 46, 124
See application file for complete search history.

(56) References Cited

U.S. PATENT DOCUMENTS

| | | | | |
|---|---|---|---|---|
| 2,584,666 A | * | 2/1952 | Bockrath | 244/38 |
| 2,584,667 A | * | 2/1952 | Bockrath | 244/38 |
| 3,529,790 A | * | 9/1970 | Buch | 244/48 |
| 4,247,061 A | * | 1/1981 | Kuczynski et al. | 244/17.19 |
| 4,390,153 A | | 6/1983 | Wuermseer | |
| 7,887,009 B2 | * | 2/2011 | Keeler et al. | 244/131 |

FOREIGN PATENT DOCUMENTS

| | | | |
|---|---|---|---|
| CA | 2121823 A1 | 10/1995 | |
| EP | 0483049 A | 4/1992 | |
| FR | 801893 A | 8/1936 | |
| FR | 859103 A | 12/1940 | |
| FR | 2645930 A | 10/1990 | |
| JP | 04321488 A | * 11/1992 | |

OTHER PUBLICATIONS

International Search Report and Written Opinion dated Oct. 14, 2008.

* cited by examiner

*Primary Examiner* — Timothy D Collins
*Assistant Examiner* — Brian M O'Hara
(74) *Attorney, Agent, or Firm* — Dickinson Wright PLLC

(57) ABSTRACT

The disclosed embodiments relate to an aircraft equipped with at least one device for attaching a lift member to the fuselage which includes elastic articulations whose rigidity in translation and in rotation can be adjusted axially, vertically, and transversely. An airfoil may be connected to the body of the fuselage by these elastic articulations.

11 Claims, 3 Drawing Sheets

DEVICE FOR ATTACHING A LIFT MEMBER TO THE FUSELAGE OF AN AIRCRAFT

This application is the National stage of International Application PCT/FR2008/050668, International Filing Date 15 Apr. 2008, which designated the United States of America, and which International Application was published under PCT Article 21 (s) as WO Publication 2008/145892 A1 and which claims priority from, and the benefit of French Application No. 07 54529 filed on 17 Apr. 2007, the disclosures of which are incorporated herein by reference in their entireties.

BACKGROUND

The disclosed embodiments relate to a linkage between at least one support element and an aircraft fuselage. A support element means a supporting surface such as the airfoil or a horizontal fin of the aircraft. More precisely, the disclosed embodiments relate to a device for fastening such a support element to the fuselage structure of the aircraft.

In flight, the aircraft is subjected to various aerodynamic stresses that have repercussions on both the airfoil and on the fuselage and the linkage between these two elements. For example, the airfoil tends to bend in flight under the vertical force, which compresses the flanks of the fuselage. In the same way, compressive and tensile forces are applied to the airfoil, involving an elongation of the bottom surface and a shortening of the top surface of said airfoil, imposing a similar deformation on the central airfoil casing contained in the bottom section of the fuselage. The linkage between the airfoil and the aircraft fuselage must also support the stresses due to the excursion of the airfoil, to the forces arising from the bending torque of the airfoil, from the aerodynamic load, and from shear stresses on the airfoil. In the same way, the linkage between the airfoil and the fuselage must support the deformations due to the pressure and compression of the lateral walls of the fuselage deforming the entire fuselage volume.

Various fastening devices are presently known for linking the airfoil to the fuselage, considering the mechanical and manufacturing constraints of an aircraft.

For example, in the case of an airfoil positioned in the lower part of the central section of the fuselage, it is known how to use a cross and T-junction. To do this, the fuselage integrates the central airfoil casing in its internal volume, and then each half-airfoil is brought laterally to the right or left wall of the central airfoil casing and is fastened there. The horizontal cross enables the linkage of the top surface panels of the central casing and of the airfoil while the horizontal T enables the linkage of the bottom surface panels of the central casing and of the airfoil. The fuselage is linked to the central airfoil casing by the horizontal cross and by the frames. Such a fastening device greatly complicates the manufacture of the fuselage, especially in its central part. Actually, it is necessary to adapt the fuselage structure so that said fuselage is compatible with the displacements between the fuselage and the airfoil during certain maneuvers. Furthermore, the fastening of the half-airfoils is very complex and calls upon numerous fasteners to join all of the upper/lower surface panels to one another.

It is also known how to fasten the airfoil in the upper part of the fuselage through a "cap" joint. Such an airfoil is made in one part to be brought to the upper part of the fuselage, once each is finished. The weight of such an assembly is not optimal for two principal reasons; the introduction of load is localized, and the number of parts is great. In other respects, such a device is difficult to apply without a weight penalty for an aircraft that has a low-flex wing, for which there is a concentration of forces on the rear longeron of the airfoil, in some cases of flight determining the size of the structure.

It is also known how to use tension bolt junctions. However, such junctions are unsatisfactory since they do not permit optimal transmission of airfoil torsional forces to the fuselage.

SUMMARY

In the disclosed embodiments, it is attempted to produce a junction between the fuselage and a supporting surface of an aircraft that is simplified in comparison with the junctions currently used, in order to facilitate the assembly between the fuselage and said supporting surface. Assembly pursuant to the disclosed embodiments is faster and simpler than those of the prior art, which in particular, permits a reduction of the costs of manufacturing an aircraft.

To this end, in the disclosed embodiments the supporting surface is fastened to the body of the fuselage through couplers that are mechanically flexible in the Y direction but rigid in the X and Z directions. Directions X, Y, and Z refer to the frame of reference of the aircraft, where X is the longitudinal axis of the fuselage of the aircraft, Y is the transverse axis, and Z is the vertical axis. More precisely, elastic links such as those manufactured by the HUTCHINSON Company are especially suitable for linking the airfoil to the fuselage of an aircraft, since the junction obtained is intended to be subjected to low-amplitude oscillatory and rotational motions. An elastic linkage is traditionally composed of two concentric tubes between which a ring of precompressed elastomer is intercalated. The elastic linkages are advantageously adaptable to adjust rigidity in rotation and translation to the mechanical characteristics that the desired linkage should have, especially by modifying the thickness of the elastomeric bed and/or adding intermediate sheets between the concentric tubes. Laminating an elastic link also contributes to reducing the energy dissipation of the elastomer under heavy radial loads. For example, elastic linkages can be arranged so that the longitudinal axis of said linkages extends along the Y axis in order to permit motions of translation in the Y direction. It is preferable to use elastic links of the laminated type, i.e. links that have at least one intermediate sheet in the bulk of the elastomer so as to increase the rigidity of the link in the XZ plane, to limit any displacement in the radial plane, while essentially preserving the same torsional flexibility. Thus, in the case of the junction between the airfoil and the fuselage, the couplers, or elastic links, are adapted to permit low rotation in the X direction and even less rotation in the Z direction. The airfoil can thus bend, which allows a compression of the couplers in the Y direction, permitting independence of motions between the airfoil and the body of the fuselage. With the fastening device of the disclosed embodiments, the airfoil can be made advantageously in one part that is intended to be fastened in the upper or lower part of the fuselage. In one part means that the wings are fastened to the central casing of the airfoil before fastening the assembly to the fuselage. In the case of the junction between the fuselage and a vertical fin, the elastic linkages are adapted to permit rotation around the Y axis and to limit rotation around the X and Z axes. In other respects, because of the elasticity of the couplers, the assembly is more simple and more tolerant, which participates in increasing the service life of the aircraft.

Accordingly, the subject matter of the disclosed embodiments is an aircraft, characterized in that it is equipped with at least one device for fastening a supporting element to the fuselage that has elastic links, the rigidity of which in translation and in rotation is adjustable axially, radially, and transversely.

According to examples of the disclosed embodiments, it is possible to provide for all or some of the following supplementary characteristics:

The elastic links are laminated links;

the links are oriented so that the longitudinal axis of said links extends transversely relative to the longitudinal axis of the aircraft;

the supporting element is the airfoil of the aircraft;

elastic links join the right and left flanks of the fuselage to the right and left wings of the airfoil, respectively;

the airfoil is in a low position on the fuselage;

elastic links join a central longitudinal beam of the fuselage to the central casing of the airfoil;

the airfoil is in a high position on the fuselage;

the airfoil is monobloc, i.e. the wings and the central casing of the airfoil are made in one piece before being fastened to the fuselage;

the supporting element is a horizontal fin of said aircraft.

BRIEF DESCRIPTION OF THE DRAWINGS

The disclosed embodiments will be better understood by reading the following description and viewing the figures that accompany it. They are given by way of example and do not limit the disclosed embodiments in any way. The figures show.

DETAILED DESCRIPTION

Figure 1:
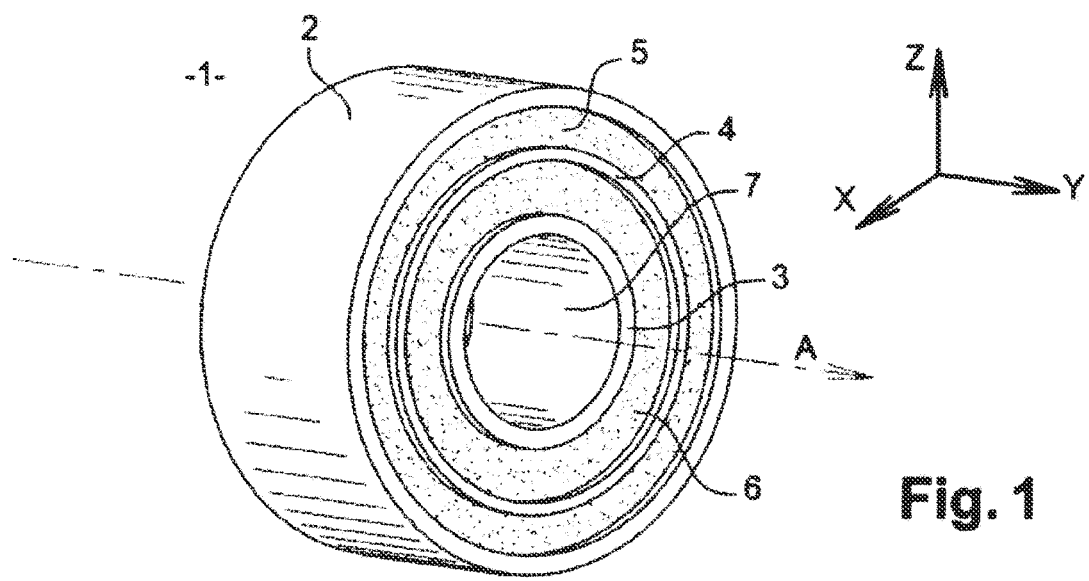
FIG. 1: an isometric representation of a laminated elastic link that can be used in the fastening device of the disclosed embodiments.

FIG. 1 shows an example of an elastic joint 1 that can be used in the fastening device according to the disclosed embodiments.

The elastic joint 1 has an external collar 2, an internal collar 3, and a sheet 4 intercalated between the two collars 2, 3, to form three concentric tubes. A first layer of elastomer 5 extends between the external collar 2 and the sheet 4, and a second layer of elastomer 6 extends between the intermediate sheet 4 and the internal collar 3. Of course it is also possible if needed to use an elastic link 1 containing no sheet 4 or having multiple sheets 4 intercalated between the external collar 2 and the internal collar 3.

Figure 6:
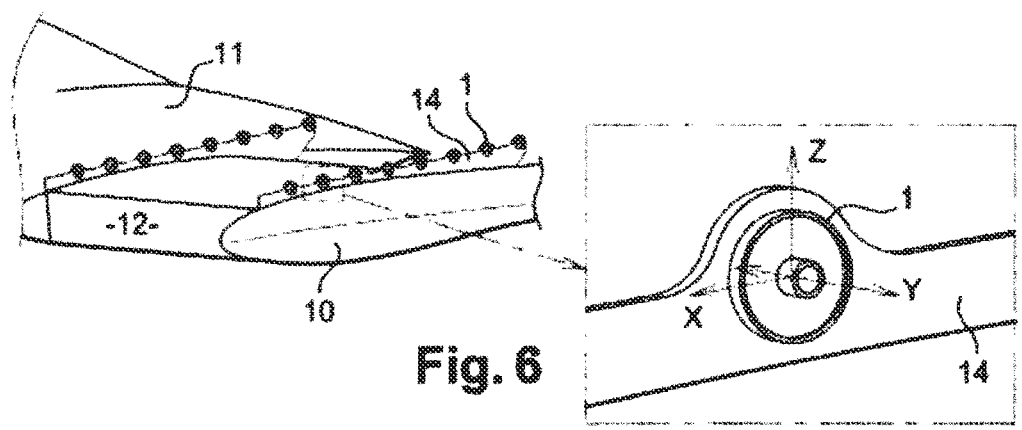
FIGS. 6 and 7: enlargements of an elastic link at the junction between the airfoil and the fuselage of an aircraft according to the disclosed embodiments.
Figure 7:
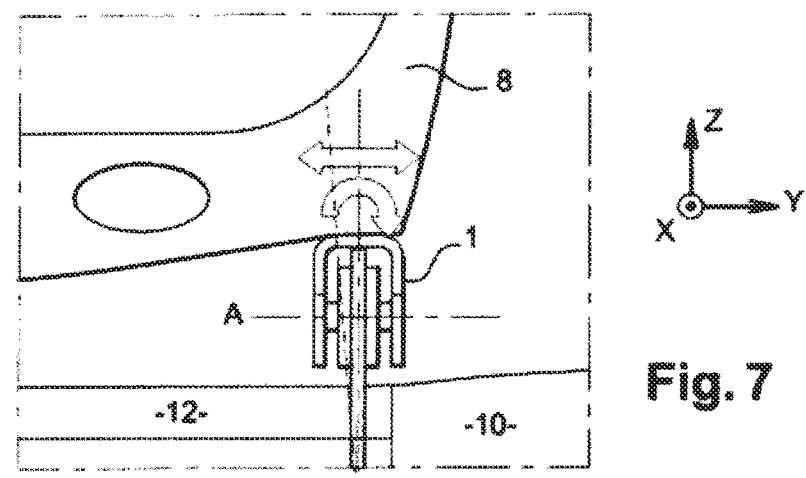

It is advantageous, as shown in FIGS. 6 and 7, for the articulated links 1 to be oriented in the fastening device so that the longitudinal axis A of the elastic link 1 extends along the Y axis of the aircraft frame of reference, so that the articulated linkage obtained between the support element and the fuselage can permit slight translation in the Y direction and slight rotation in the X direction, and is essentially immobile in the Z direction (FIG. 7).

Figure 2:
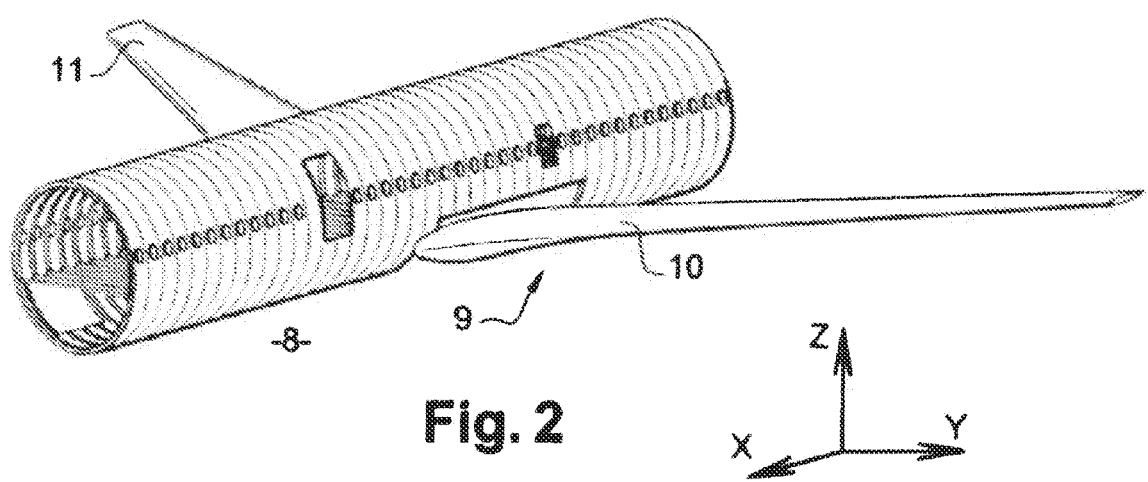
FIG. 2: an isometric representation of a central section of the fuselage with the airfoil in a low position.

FIG. 2 shows a section of fuselage 8 at the linkage to the airfoil 9, with said airfoil fastened in the lower part of the fuselage section 8. The airfoil 9 has two wings 10 and 11 and a central casing 12 (visible in FIGS. 3 and 4). As will be explained in further detail below, the airfoil 9 can be made in one piece before being fastened to the section 9, in the case in which it is fastened to the section 8 by the fastening device according to the disclosed embodiments.

Figure 3:
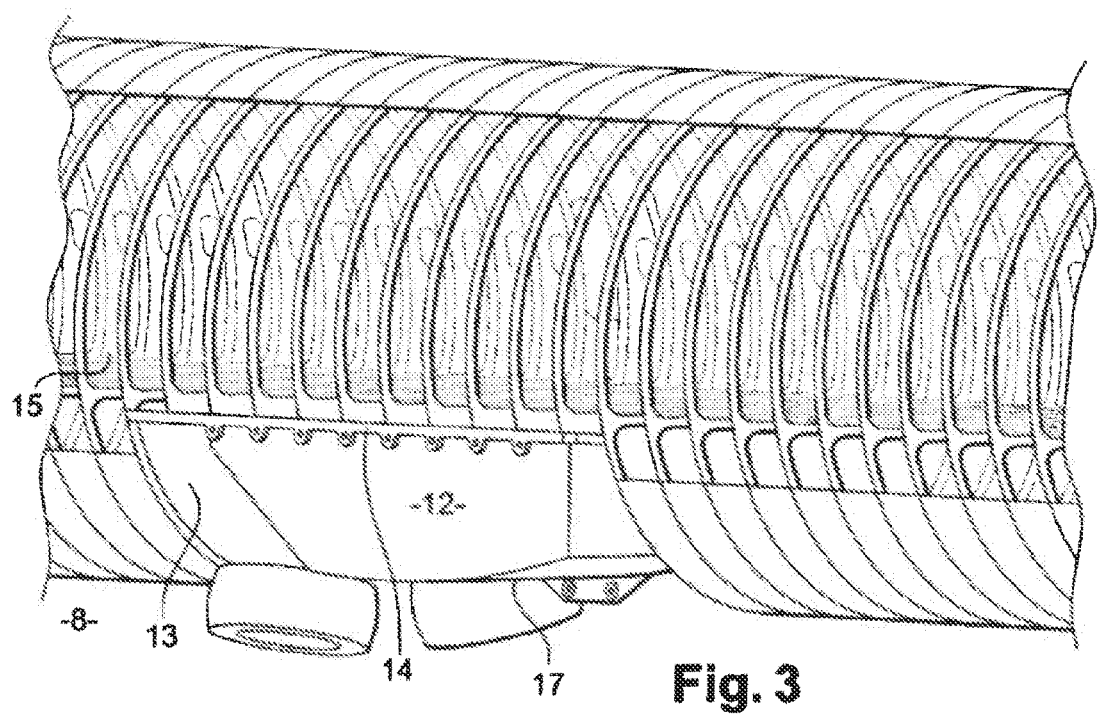
FIGS. 3 and 4: a first example of fastening according to the disclosed embodiments between an airfoil and a central fuselage section.
Figure 4:
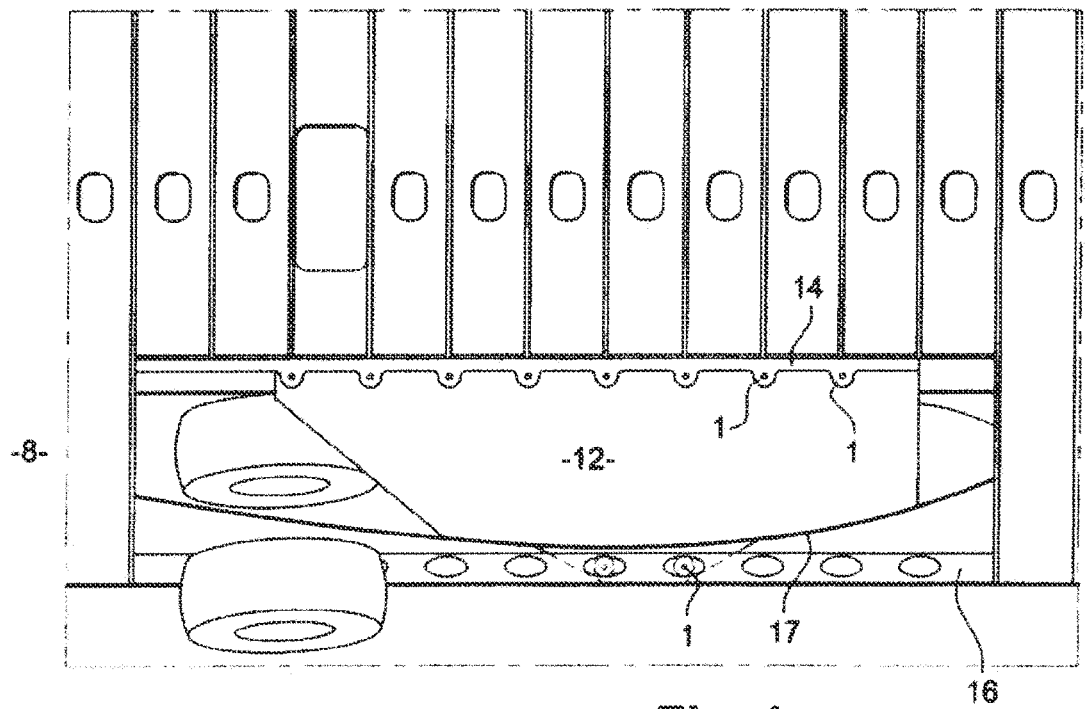

To facilitate visibility, the wings 10 and 11 are not shown in FIGS. 3 and 4. FIG. 3 shows the central fuselage section 8 and the central airfoil casing 12 in side view, and FIG. 4 shows a view from below.

Figure 5:
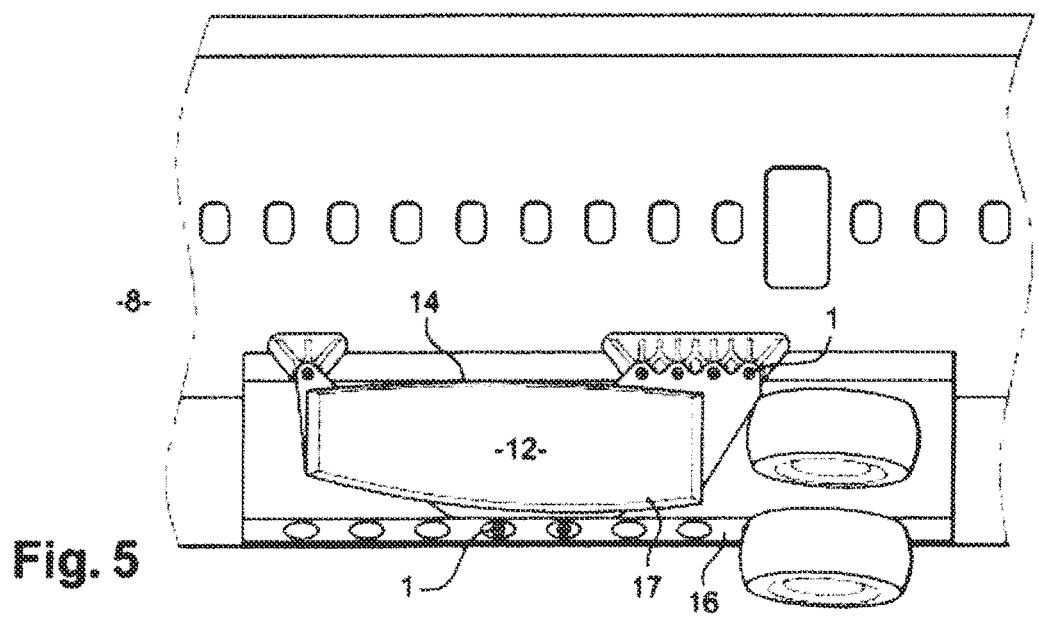
FIG. 5: a second example of fastening according to the disclosed embodiments between an airfoil and a central fuselage section.

It is advantageous to produce the airfoil 9 in its entirety, i.e. by fastening the wings 10 and 11 to the lateral walls of the central airfoil casing 12, before positioning the central fuselage section 8 on said airfoil 9 to lodge the central airfoil casing 12 in a cavity 13 in the lower part of the central fuselage section 8. An upper lateral flange 14 of the central airfoil casing 12 is then fastened to the corresponding lateral wall 15 of the central fuselage section 8 by means of a plurality of elastic links 1. The elastic links 1 are arranged in a single longitudinal row, with each elastic link being arranged so that its longitudinal axis extends transversely to the longitudinal axis of the fuselage. Of course it is possible to provide multiple longitudinal rows of elastic links 1 arranged one beneath the other. In the same way, the row of elastic links 1 can be continuous, i.e. the elastic links are arranged regularly along the entire length of the upper lateral wall 14 of the central airfoil casing 12 (FIGS. 3, 4). By length is meant the dimension of the central airfoil casing 12 extending parallel to the longitudinal axis of the fuselage. On the other hand, the row of elastic links 1 can be interrupted, as shown in FIG. 5. In this second example of embodiment, the elastic links 1 are concentrated in the forward and rear parts of the upper lateral flange 14 of the central airfoil casing 12. Forward and rear relate to the direction of motion of the aircraft. The total number of flexible links 1 is thus reduced, which reduces the total weight of the fastening device, by concentrating said elastic links 1 at the functional areas of the airfoil/fuselage junction.

Once the upper lateral flange 14 of the central airfoil casing 12 is fastened to the lateral wall 15 of the fuselage 8, a ventral beam 16 is introduced beneath the central airfoil casing 12 to close off the compartment 13. The ventral beam 16 is a longitudinal beam extending parallel to the longitudinal axis of the fuselage 8. A lower flange 17 of the central airfoil casing 12 is fastened to the central ventral beam 16 by two elastic links 1. Of course a larger number of elastic joints 1 can be used. The airfoil stresses are absorbed at the fuselage 8 by the tilt of three transfer zones, with two being located on the flanks of the fuselage 8, and the last one being located at the central ventral beam 16.

In another example of embodiment, the compartment 13 is not closed off by a central beam 16. In the same way, when the airfoil 9 is located in the upper part of the central section of the fuselage 8, it is not necessary to close off the compartment 13 with a central beam 16.

The use of elastic links 1 in the fastening devices pursuant to the disclosed embodiments permits making an airfoil 9 in one piece then to be fastened only once to the fuselage 8. Of course it is also possible to proceed in three steps, in other words to integrate the central airfoil casing 12 with the fuselage 8 before then fastening each of the two wings 10, 11. In other respects, the flexibility of the elastic links 1, because of the presence of the layer of elastomer 5, 6, allows assembly tolerances that permit compensating for any slight misfit between the wall 15 of the fuselage 8 and the airfoil 9.

The elastic links 1 of the fastening device pursuant to the disclosed embodiments allow for a hyperstatic isostatic system.

In the context of the airfoil junction, these elastic links 1 assure the compatibility of deformations between the fuselage 8 and the wings 10, 11, while providing for simple assembly that is tolerant for positioning. These elastic links 1 can also play a role in filtering high-frequency vibrations between the fuselage and the airfoil, consequent to engine, system, and gearing vibrations in particular.

As shown in FIGS. 6 and 7, the elastic joint 1 is oriented transversely, so that the longitudinal axis of the elastic joint 1 extends along the Y axis of the aircraft frame of reference in order to have low rigidity in the Y direction and high rigidity in the X and Z directions to allow slight translation in the Y direction of the order of 10 mm and slight rotation in the X direction of the order of 1°.

Of course the rigidities in rotation and translation can be adapted axially, radially, and transversely, depending on the destination of the fastening device. The number and size of the elastic links 1 are advantageously a function of the loads that have to pass through these links, which may vary from one airfoil to another, or from one horizontal fin to another. Specifically in the case of horizontal fins, to the extent that rotation around Y is to be possible, and practically zero around X, the rigidity of the elastic links in translation and in rotation are adjusted differently. Such adaptations can be accomplished easily by one skilled in the art.

The invention claimed is:

1. A fixed wing aircraft, comprising:
a fuselage having a longitudinal axis (X), a transverse axis (Y) and a vertical axis (Z);
an airfoil comprising two fixed wings and a central casing;
at least one laminated elastic link through which the airfoil is fastened to the fuselage, wherein the at least one laminated elastic link has a longitudinal axis (A), and the at least one laminated elastic link secures the airfoil to the fuselage in a configuration in which the longitudinal axis (A) of the at least one laminated elastic link extends along the transverse axis (Y) of the fuselage and provides translational movement between the airfoil and fuselage in the direction of the transverse axis (Y) of the fuselage; and
wherein the at least one laminated elastic link is comprised of precompressed elastomer between two concentric tubes.

2. The aircraft of claim 1, wherein the at least one laminated elastic link is comprised of at least one intermediate sheet in a bulk elastomer.

3. The aircraft of claim 1, wherein the at least one laminated elastic link is further configured to provide rotational movement in a direction around the longitudinal axis (X) of the aircraft.

4. The aircraft of claim 1, wherein the at least one laminated elastic link is further configured to be essentially immobile in the vertical axis (Z) direction of the aircraft.

5. The aircraft of claim 1, wherein an upper lateral flange of the central airfoil casing is fastened to a lateral wall of a central section of the fuselage by a plurality of laminated elastic links.

6. The aircraft according to claim 1, wherein a plurality of elastic links join right and left flanks of the fuselage to right and left wings of the airfoil, respectively.

7. The aircraft according to claim 1, wherein the airfoil is fastened to a lower part of the fuselage.

8. The aircraft according to claim 7, wherein a plurality of elastic links join a central longitudinal beam of the fuselage to the central casing of the airfoil.

9. The aircraft according to claim 1, wherein the airfoil is fastened to an upper part of the fuselage.

10. The aircraft according to claim 1, wherein the airfoil comprises a monobloc.

11. The aircraft according to claim 1, wherein the airfoil is a horizontal fin of said aircraft.

* * * * *